Jan. 29, 1963   H. SINCLAIR   3,075,354
HYDRAULIC TURBO COUPLINGS
Filed June 24, 1960   2 Sheets-Sheet 1
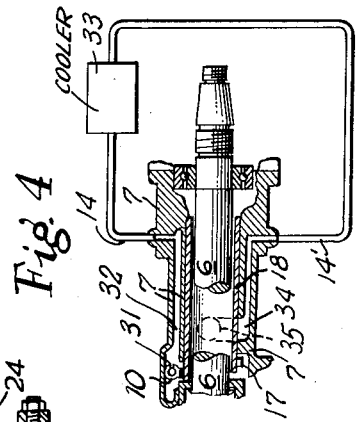
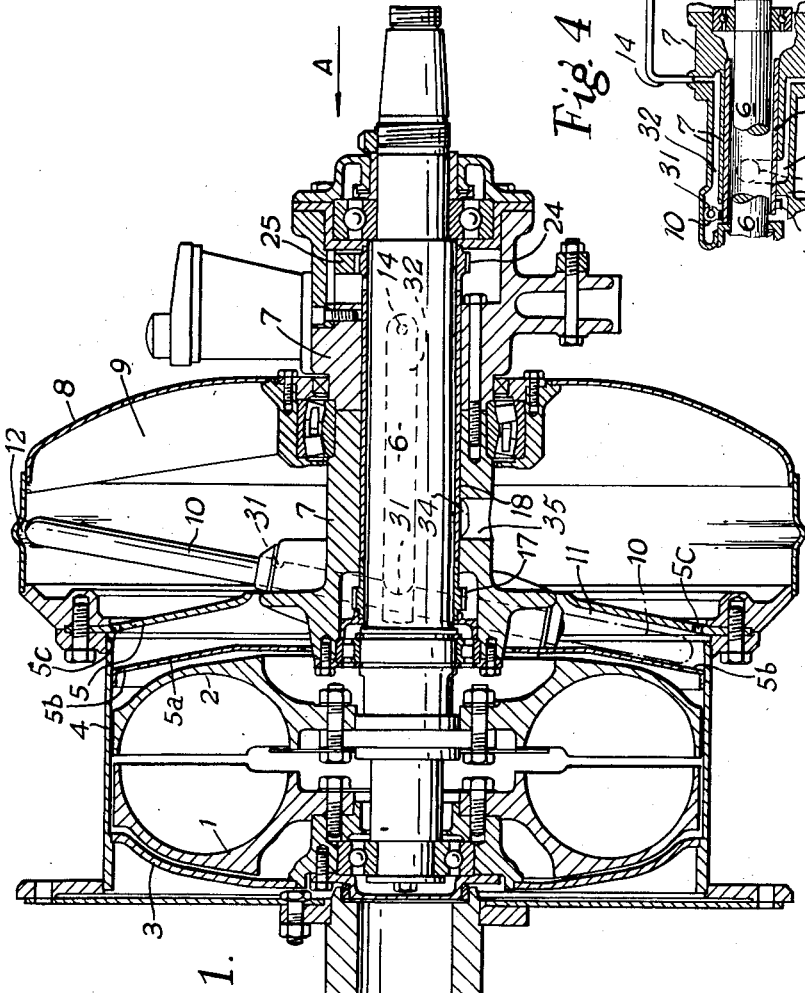
INVENTOR
HAROLD SINCLAIR
BY
Benjamin Sweedler
ATTORNEY Jan. 29, 1963   H. SINCLAIR   3,075,354
HYDRAULIC TURBO COUPLINGS
Filed June 24, 1960   2 Sheets-Sheet 2
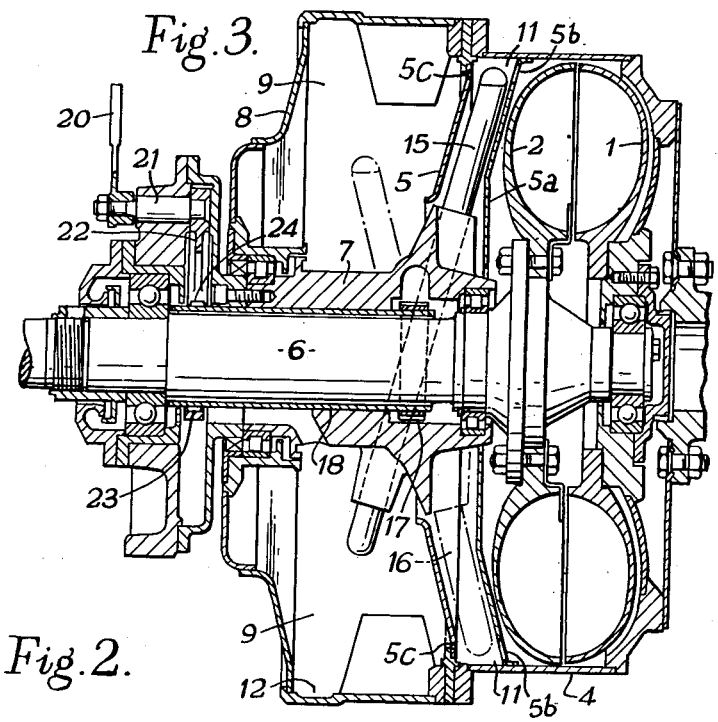
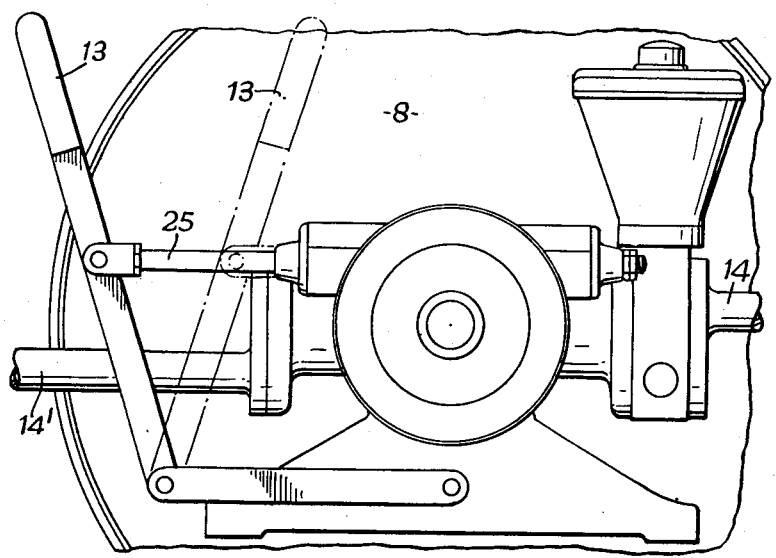
INVENTOR
HAROLD SINCLAIR
BY
Benjamin Sweedler
ATTORNEY United States Patent Office 3,075,354
Patented Jan. 29, 1963

3,075,354
HYDRAULIC TURBO COUPLINGS
Harold Sinclair, 5 Phillimore Garden Close,
London W8, England
Filed June 24, 1960, Ser. No. 38,503
Claims priority, application Great Britain Sept. 3, 1953
2 Claims. (Cl. 60—54)

This invention relates to a hydraulic turbo coupling comprising vaned impeller and runner elements within a casing connected for rotation with one of said elements together forming a working chamber, a chamber within said working chamber to accommodate a scoop tube, and a reservoir chamber adjacent to said scoop tube accommodating chamber, a scoop tube with scooping orifices at both ends thereof disposed with one of said scooping orifices in said scoop tube accommodating chamber and the other of said scooping orifices in said reservoir chamber, and means movably mounting said scoop tube to permit adjustment thereof selectively to positions in which, when said working chamber and reservoir are rotating, working liquid can be transferred via said scoop tube from said scoop tube accommodating chamber to said reservoir chamber or from said reservoir chamber to said scoop tube accommodating chamber.

The object of the invention is to provide means for cooling the working liquid and the rotating mechanical parts of the coupling, both when the working circuit is full and when it is empty of liquid.

In order that the invention may be clearly understood and readily carried into effect, it will now be described in more detail with reference to the accompanying drawings, in which:

FIG. 1 is a view in vertical section of a turbo coupling according to the invention provided with one scoop tube, FIG. 2 is a view, looking in the direction of arrow A, of part of the coupling shown in FIG. 1, FIG. 3 is a view in vertical section of a turbo coupling according to the invention provided with two scoop tubes, and FIGURE 4 is a longitudinal section through the coupling shown in FIGURE 1, at right angles to FIGURE 1.

Referring to FIGS. 1 and 2, the turbo coupling illustrated comprises a vaned impeller 1 and a vaned runner 2, the back 3 of the impeller 1 being connected in the neighbourhood of its periphery to a casing comprising a cylindrical part 4 which projects axially beyond the runner 1, and a truncated conical part 5 which projects radially inwardly towards the runner shaft 6 and away from the impeller 1. The conical part 5 has a central orifice which is larger in diameter than the stationary scoop tube housing 7 that is provided on the runner shaft 6. To the said casing is secured, in the neighbourhood of the junction of the cylindrical and conical parts 4 and 5 respectively, a casing 8 which forms with the part 5 a reservoir chamber 9, and the end wall of which has a central orifice slightly larger in diameter than the stationary scoop tube housing 7, which projects through the orifices in the parts 5 and 8.

The stationary housing 7 serves as a guide for a double-ended scoop tube 10 which has at its respective ends oppositely directed scoop orifices which open respectively above the runner shaft 6 into the reservoir chamber 9 and below the runner shaft 6 into the space 11 between the conical part 5 and an annular casing 5a secured at its periphery to the part 4, the space 11 being hereinafter termed the "scoop tube accommodating chamber." Orifices 5b of large area in the casing 5a near the periphery thereof provide free communication between the scoop tube accommodating chamber and the working circuit. The scoop tube 10, which is inclined to the axis of the coupling so that it is approximately parallel to the conical part 5 below the axis of the coupling, is slidable longitudinally in the stationary housing 7. The part 5 is provided near its periphery with restricted orifices 5c of small area.

In the normal operation of the coupling, when suitably charged with working liquid and with the scoop tube 10 in its uppermost position (indicated in full lines), and hence retracted from the scoop tube accommodating chamber 11, the said chamber 11, which is in free communication with the working circuit between the impeller 1 and the runner 2 via the annular gap between the peripheries of the impeller and runner and the orifices 5b, has formed in it a ring of working liquid the radially inner boundary of which is substantially level with the inner boundary of the liquid vortex ring in the said working chamber. The lower scoop tube orifice, which opens in the opposite direction to the direction of movement of the ring of liquid in the chamber 11, is now radially just within the inner boundary of the said ring of liquid. Due to the pressure head of liquid in the scoop tube accommodating chamber at the orifices 5c, liquid flows at a restricted rate from the chamber 11 to the reservoir chamber, where it is picked up by the scoop tube and transferred back to the chamber 11.

When it is required to empty the working circuit, the scoop tube 10 is shifted longitudinally downwards to the limit of its travel, determined by a suitable stop (not shown), into its lowermost or extended position, so that the lower end of the scoop tube 10 is inserted into the ring of liquid in the chamber 11 with the lower scoop orifice near the junction of the cylindrical part 4 and the conical part 5 (as shown in broken lines). The liquid is thereby rapidly transferred from the chamber 11 to the reservoir chamber 9 directly through the scoop tube 10, whereby the working circuit is rapidly emptied. The liquid that is transferred to the reservoir chamber 9 forms a rotating ring the inner boundary of which is now radially beyond the upper scoop tube orifice, but which is radially nearer to the coupling axis than are the orifices 5c, so that due to the pressure head at the orifices 5c liquid flows at a restricted rate from the reservoir chamber 9 through the orifices 5c to the chamber 11, where it is picked up by the lower scoop orifice and is returned to the reservoir chamber 9. Thus, even when the working circuit is empty, a cooling circulation of working liquid is maintained to remove heat from the rotating elements of the coupling, such as the heat generated in the working liquid during prior operation and to remove heat generated from windage within the working circuit when the circuit is empty at high relative speed of the impeller and runner.

In order to fill the working circuit again, the scoop tube 10 is shifted upwardly to the upper limit of its travel, determined by a stop (not shown), whereby the upper end of the scoop tube 10 is inserted into the ring of liquid in the reservoir chamber 9 and the lower end of the scoop tube is retracted from the chamber 11. The upper scoop orifice opens in the opposite direction to the direction of rotation of the ring of liquid in the reservoir chamber 9, and accordingly the liquid is rapidly transferred directly through the scoop tube 10 from the reservoir chamber 9 to the chamber 11 and thus into the working circuit. In order that substantially the whole of the liquid may be transferred, the reservoir chamber 9 is formed with an annular groove 12 in which the upper scoop tube orifice is disposed when the scoop tube 10 is in its upper-most position of adjustment.

It is desirable to use certain proportional dimensions of the reservoir chamber 9 and the working circuit so that the volume of liquid transferred by the scoop tube 10 from the chamber 11 when moved from its retracted position to its fully extended position in the chamber 11 is substantially equal to the volume transferred by the scoop tube from the reservoir chamber when it is moved through the same distance in the converse direction, and so that the working liquid will be retained within the working circuit and reservoir chamber 11 both when the coupling is rotating (the liquid then being retained under the action of centrifugal force), and when the coupling is stopped (the liquid then collecting by gravity in the lower part of the reservoir chamber and working circuit).

The means for operating the scoop tube may include a lever 13 (see FIG. 2) with which the abovementioned stops cooperate to limit the travel of the scoop tube, the lever 13 operating a rack 25 which cooperates with teeth 24 on a sleeve 18 which is angularly movable within the housing 7 and is provided with teeth 17 which cooperate with rack teeth (not shown) on the scoop tube 10.

To enable the scoop tube 10 to transfer liquid from the chamber 11 to the reservoir chamber 9 and vice versa via a cooler, the well-known practice of arranging ports and ducts between the scoop tube and an external circuit may be used; for example, as illustrated in FIG. 4, the scoop tube 10 may be provided with ports 31 which in each extended position of the scoop tube communicate with a duct 32 in the housing 7, the duct communicating with pipe 14 which leads the liquid to a cooler 33, from which cooler liquid is returned via pipe 14' to a duct 34 in housing 7 and thence to the reservoir chamber 9 through an aperture 35 in the housing 7.

In the embodiment of the invention illustrated in FIG. 3 the turbo coupling is provided with two scoop tubes 15 and 16 both slidable longitudinally in the stationary scoop tube housing 7. The scoop tube 15 has one end projecting into the part of the chamber 11 above the housing 7 and its other end projecting into the reservoir chamber 9 below the housing 7. The scoop tube 16 (shown in chain-dotted lines) has one end projecting into part of the transfer chamber 11 below the housing 7 and the other end projecting into the reservoir chamber 9 above the housing 7. The two scoop tubes are interconnected mechanically with the operating racks geared to the same pinion 17 so that their motions are always in the same sense, both being extended into or retracted from the chamber 11 together.

By arranging that each of the scoop tubes 15 and 16 serves for the transfer of liquid directly through it from the reservoir chamber 9 to the scoop tube accommodating chamber 11 and vice versa, the operations of filling and emptying the working circuit are speeded up as compared with the arrangement of FIGS. 1 and 2 in which only one scoop tube is employed.

If desired, three or more mechanically interconnected scoop tubes may be provided for still further shortening the times required for filling and emptying the working circuit.

Alternatively, where two (or more) scoop tubes are provided as in FIG. 3, one of them, say the scoop tube 15, may be arranged to transfer liquid directly through it from the reservoir chamber 9 to the scoop tube accommodating chamber 11 and vice versa, and the other scoop tube 16 may serve for the circulation of liquid via a cooler. Leak-off nozzles 5c are provided near the periphery of the conical part 5 so that after the liquid transfer has been effected and the conditions of flow have stabilised liquid will flow at a restricted rate from the filled working circuit to the reservoir chamber 9 or on the other hand from the filled reservoir chamber to the working circuit according to whether the scoop tubes are set at or near one end or the other end of their respective full travel.

Preferably, the scoop tube 16 is longer than scoop tube 15 and projects further into the groove 12 than the scoop tube 15 so that the narrow ring of liquid which collects in the groove by leakage through the said nozzles is entrained by the scoop tube 16 before it can attain a thickness such that it is entrained by the scoop tube 15. Similarly, the scoop tube 16 projects further than the scoop tube 15 into the transfer chamber when the scoop tubes are set at the other end of their travel. The scoop tube 16 will be formed with one or more ports, which communicate with an axial duct (not shown) in the stationary housing 7, which duct communicates with an external cooler (not shown).

Liquid entrained by the scoop tube 16 is thereby fed through one end of the scoop tube 16 and via said duct to the cooler, the return flow from the cooler to the reservoir chamber 9 being conducted through a duct (not shown) in the housing 7 to the reservoir chamber 9. When the working circuit is empty the scooping orifices of both scoop tubes are radially within the ring of liquid in the reservoir chamber 9, but the inner boundary of the said ring is radially nearer to the coupling axis than the orifices 5c, so that the pressure head at the said orifices causes a restricted flow from the reservoir chamber 9 to the chamber 11, whence liquid is transferred by the scoop tube 16 via the external cooler to the reservoir chamber 9.

The abovementioned mechanical interconnection of the scoop tubes 15 and 16 may be effected, as shown, by teeth 17 on a sleeve 18 which is angularly movable within the housing 7, the said teeth cooperating with rack teeth (not shown) on the scoop tubes. The operating means for the scoop tubes comprises a lever 20 on a pin 21 which carries an internally toothed sector 22 the teeth 23 of which engage with teeth 24 on the sleeve 18. Angular movement of the lever 20 causes angular movement of the sector 22 and hence of the sleeve 18, whereby the scoop tubes 15 and 16 are moved longitudinally in unison.

This application is a continuation in part of the application of Harold Sinclair, Serial No. 453,359, filed August 31, 1954, now abandoned.

I claim:

1. A hydraulic turob coupling comprising coaxial vaned impeller and runner elements defining a toroidal working circuit, a casing connected for rotation with one of said elements to form a working chamber therewith in which said other element is housed, a scoop tube accommodating chamber formed at one end of said working chamber and with means providing unrestricted fluid communication therewith adjacent its periphery, a reservoir chamber adjacent said scoop tube accommodating chamber, one of the end walls of said casing being provided with at least one bleed aperture in a region which is submerged by working liquid in said working chamber when said working chamber is substantially filled, said bleed aperture interconnecting said working chamber and said reservoir chamber, said reservoir chamber having an outer portion lying at a greater radial distance from the coupling axis than the bleed aperture, the volumetric capacity of said outer portion being less than the volumetric capacity of the working chamber whereby the ring of fluid in the reservoir will extend radially inward beyond said bleed passage when said working chamber is empty, scoop tube means having oppositely disposed scopping orifices positioned with one of said scopping orifices in said scoop tube accommodating chamber and the other of said scooping orifices in said reservoir chamber, and means movably mounting said scoop tube means to adjust same selectively to a position in which, when said working chamber and reservoir chamber are rotating, working liquid can be transferred from said reservoir chamber outer portion to said scoop tube accommodating chamber via said scoop tube means or to a position in which, when said working chamber and reservoir chamber are rotating, working liquid can be transferred from said scoop tube accommodating chamber to said reservoir chamber via said scoop tube means.

2. A hydraulic turbo coupling comprising coaxial vaned impeller and runner elements defining a toroidal working circuit, a casing connected for rotation with one of said elements to form a working chamber therewith in which said other element is housed, a scoop tube accommodating chamber formed at one end of said working chamber and with means providing unrestricted fluid communication therewith adjacent its periphery, a reservoir chamber adjacent said scoop tube accommodating chamber, one of the end walls of said casing being provided with at least one bleed aperture in a region which is submerged by working liquid in said working chamber when said working chamber is substantially filled, said bleed aperture interconnecting said working chamber and said reservoir chamber, said reservoir chamber having an outer portion lying at a greater radial distance from the coupling axis than the bleed aperture, the volumetric capacity of said outer portion being less than the volumetric capacity of the working chamber whereby the ring of fluid in the reservoir will extend radially inward beyond said bleed passage when said working chamber is empty, scoop tube means having oppositely disposed scooping orifices positioned with one of said scooping orifices in said scoop tube accommodating chamber and the other of said scooping orifices in said reservoir chamber, means movably mounting said scoop tube means to adjust same selectively to a position in which, when said working chamber and reservoir chamber are rotating, working liquid can be transferred from said reservoir chamber outer portion to said scoop tube accommodation chamber via said scoop tube means or to a position in which, when said working chamber and reservoir chamber are rotating, working liquid can be transferred from said scoop tube accommodating chamber to said reservoir chamber via said scoop tube means, cooling means, and passage means for directing the working liquid through said cooling means during passage through said scoop tube means.

References Cited in the file of this patent

UNITED STATES PATENTS

| | | |
|---|---|---|
| 2,187,656 | Kiep et al. | Jan. 16, 1940 |
| 2,423,812 | Karl et al. | July 8, 1947 |
| 2,536,473 | Sinclair | Jan. 2, 1951 |

FOREIGN PATENTS

| | | |
|---|---|---|
| 815,133 | Germany | Sept. 27, 1951 |